United States Patent
Van Gorkom

(10) Patent No.: US 7,463,227 B2
(45) Date of Patent: Dec. 9, 2008

(54) DISPLAY DEVICE COMPRISING A LIGHT GUIDE

(75) Inventor: Gerardus G. P. Van Gorkom, Eindhoven (NL)

(73) Assignee: Uni-Pixel Displays, Inc., The Woodlands, TX (US)

( * ) Notice: Subject to any disclaimer, the term of this patent is extended or adjusted under 35 U.S.C. 154(b) by 835 days.

(21) Appl. No.: 10/628,942

(22) Filed: Jul. 29, 2003

(65) Prior Publication Data

US 2004/0061665 A1    Apr. 1, 2004

(51) Int. Cl.
*G09G 3/34* (2006.01)

(52) U.S. Cl. .......................... 345/85; 345/30

(58) Field of Classification Search ............ 345/30–32, 345/36, 51, 85, 87, 102, 108
See application file for complete search history.

(56) References Cited

U.S. PATENT DOCUMENTS

| | | | | |
|---|---|---|---|---|
| 4,113,360 A | * | 9/1978 | Baur et al. | 345/84 |
| 4,264,147 A | * | 4/1981 | Baur et al. | 349/70 |
| 4,327,970 A | * | 5/1982 | Baur et al. | 349/70 |
| 5,223,965 A | * | 6/1993 | Ota et al. | 349/150 |
| 5,631,664 A | * | 5/1997 | Adachi et al. | 345/74 |
| 5,690,773 A | * | 11/1997 | Fidalgo et al. | 156/267 |
| 5,691,103 A | * | 11/1997 | Takeyama et al. | 430/200 |
| 5,751,107 A | * | 5/1998 | Komatsu | 313/496 |
| 5,771,321 A | * | 6/1998 | Stern | 385/31 |
| 6,211,937 B1 | * | 4/2001 | Miyachi et al. | 349/156 |
| 6,266,121 B1 | * | 7/2001 | Shigeta et al. | 349/156 |
| 2004/0145696 A1 | * | 7/2004 | Oue et al. | 349/167 |

FOREIGN PATENT DOCUMENTS

EP             675477    *   4/1995

\* cited by examiner

*Primary Examiner*—Regina Liang
(74) *Attorney, Agent, or Firm*—Fletcher Yoder

(57) ABSTRACT

A display device comprises a light guide and a movable element. By locally exerting a force on the movable element by means of selection means, optical contact between the movable element and the light guide can be brought about. Light emanates from the display device at the locations where optical contact takes place. Measures are taken to employ the force exerted by the selection means as efficiently as possible. This can be achieved by making the force act at the location where the optical contact takes place and/or by reducing other adhesive forces (caused, inter alia, by differences in pressure, static charging, surface stresses, van der Waals' forces and/or chemical forces).

11 Claims, 5 Drawing Sheets

DISPLAY DEVICE COMPRISING A LIGHT GUIDE

The invention relates to a display device comprising a light guide, a movable element and selection means to locally bring said movable element into contact with the light guide.

A display device of the type mentioned in the opening paragraph is known from U.S. patent application U.S. Pat. No. 4,113,360.

In said application a description is given of a display device comprising a first plate of a fluorescent material, in which, in operation, light is generated and trapped (so that this plate forms a light guide), a second plate which is situated at some distance from the first plate and, between said two plates, a movable element in the form of a membrane. By applying voltages to addressable electrodes on the first and second plates, the movable element can be locally brought into contact with the first plate, or the contact can be interrupted. A transparent contact liquid is present on the contact surfaces. At locations where the movable element is in contact with the first plate, light is decoupled from said first plate. This enables an image to be represented. If the movable element is not in contact with the light guide, it is in contact with the second plate.

For the proper functioning of the display device, it is important that the contact between the light guide and the movable element can be brought about and interrupted in an accurate manner. If it is impossible to interrupt a contact, then a pixel always or never emits light (dependent upon which contact cannot be interrupted). It will be obvious that this has a substantial adverse effect on the picture quality.

It is an object of the invention to provide a display device of the type mentioned in the opening paragraph, which exhibits an improved picture quality.

To achieve this, the display device in accordance with an embodiment of the invention is characterized in that said display device comprises means for reducing adhesive forces between the movable element and the light guide.

A problem which is encountered is that the force with which the movable element is brought into contact with the light guide and/or the second plate may be subject to variations, for example, because the movable element adheres (sticks) to the light guide or the second plate. As a result, the forces necessary to bring about or interrupt the contact between the light guide and the movable element cannot be predetermined. Even if all contacts can be interrupted, variations in the necessary forces cause a reduction of the picture quality, because the moment when a contact is interrupted is co-determined by the force necessary to interrupt the contact and hence variations in the necessary forces result in variations in the time period during which a pixel emits, or does not emit, light.

Such variations adversely affect the quality of the image displayed.

A reduction of the adhesive forces between the movable element and the light guide causes the forces necessary to bring about or interrupt the contact between the movable element and the light guide to become smaller, less subject to variations and better controllable. By virtue thereof, the picture quality can be improved. Within the scope of the invention, the term adhesive forces is to be taken to mean forces which are not brought about by the (settings of) the selection means.

An embodiment of the display device in accordance with the invention is characterized in that the movable element is situated in an evacuated space. An evacuated space is to be taken to mean, in this application, a space with a pressure below 1/10 atmosphere, preferably below 10 Torr.

This embodiment of the invention is based on the insight that between the lower side of the movable element and the light guide an under-pressure may develop relative to the (atmospheric) pressure at the upper side of the movable element. The pressure difference between both sides of the movable element causes a force to be exerted on the movable element, which force presses said movable element against the light guide. The size of this force is governed by the pressure difference and varies according to the atmospheric conditions and the contact between the movable element and the light guide and, hence, is uncontrollable. Since, in this embodiment, the light guide and the movable element are situated in an evacuated space, the possible pressure difference and hence said force are reduced. In this embodiment, the means for reducing the adhesive forces is constituted by the evacuated space.

An embodiment of the display device in accordance with the invention is characterized in that the movable element comprises means for removing a static charge from the movable element.

This embodiment of the invention is based on the insight that a static charge may locally form on the movable element. As a result of this charge, the movable element is locally or entirely subject to an electrostatic force which is uncontrollable. By precluding the formation of a static charge, this force is reduced or eliminated.

Preferably, the movable element is electrically conducting and at a fixed potential.

An embodiment of the display device in accordance with the invention is characterized in that the movable element is provided with an anti-adhesion layer on the side facing the light guide and/or the light guide is provided with an anti-adhesion layer on the side facing the movable element.

This embodiment of the invention is based on the insight that chemical adhesive forces may develop locally between the movable element and the light guide. As a result of these forces, the movable element is locally or entirely subject to a force which is uncontrollable. By using an anti-adhesion layer on the movable element and/or the light guide, these forces are reduced or eliminated. The anti-adhesion layer may be, for example, a Teflon layer or a parylene (poly-p-xylene) layer.

An embodiment of the display device in accordance with the invention is characterized in that the surface of the movable element facing the light guide and/or the surface of the light guide facing the movable element have/has an average roughness ($R_2$) above 5 nm, and neither of the two surfaces has a roughness in excess of 0.1 micrometer. Preferably, the roughness of both said surfaces ranges from 20 to 100 nm. If the roughness of both surfaces is below 5 nm, then van der Waals' forces occur between said surfaces. Such van der Waals' forces are large. If at least one of both surfaces exhibits a roughness above 5 nm, then van der Waals' forces are reduced substantially or are absent. If one of both surfaces exhibits a roughness above 0.1 micrometer, then the optical contact between the movable element and the light guide is reduced.

Preferably, there is no liquid between the movable element and the light guide. Although a liquid improves the optical contact between both parts, it also brings about an adhesive force (as a result of surface stresses) between the movable element and the light guide. This force depends on the manner in which the movable element and the light guide are in contact with each other and on properties of the liquid as well as on other conditions such as pressure and temperature. Consequently, the above-mentioned adhesive force is subject to variations.

In an embodiment, the selection means comprise transparent electrodes, and the movable element, if it is in contact with the light guide, contacts said light guide at the location of an electrode, causing light to emit through the transparent electrode.

In this embodiment, the movable element and the light guide are in contact with each other at the location of an electrode. This embodiment has the advantage, compared to display devices in which contact takes place next to an electrode, that the force with which the contact is brought about at the location where light emission takes place is larger and better controllable.

Preferably, for each of the above embodiments, the movable element is arranged between the light guide and a further element, and the selection means comprise means for locally generating a force causing the movable element to move towards the light guide as well as a force causing the movable element to move towards the further element. This has the advantage, compared to embodiments in which the repellent force or forces (the force with which the movable element is pushed away from the light guide) is/are formed by elastic forces in the movable element, that elastic forces depend upon the elastic properties of the movable element, and these elastic properties may exhibit variations as a result of, for example, differences in thickness, material, temperature, etc.

A display device in accordance with the invention may comprise aspects of one or, preferably, more of the above embodiments.

These and other aspects of the invention will be apparent from and elucidated with reference to the embodiments described hereinafter.

In the drawings.

The Figures are schematic and not drawn to scale, and, in general, like reference numerals refer to like parts.

Figure 1:
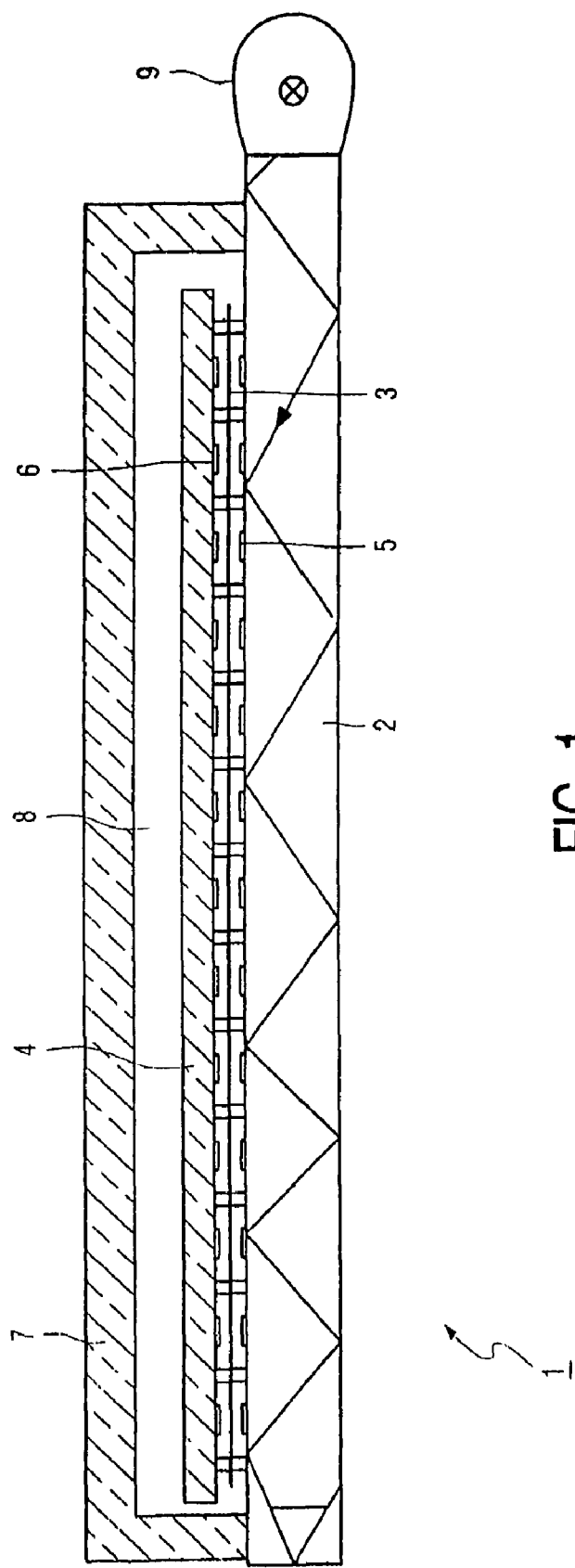
FIG. 1 is a cross-sectional view of a display device in accordance with the invention.
Figure 2:
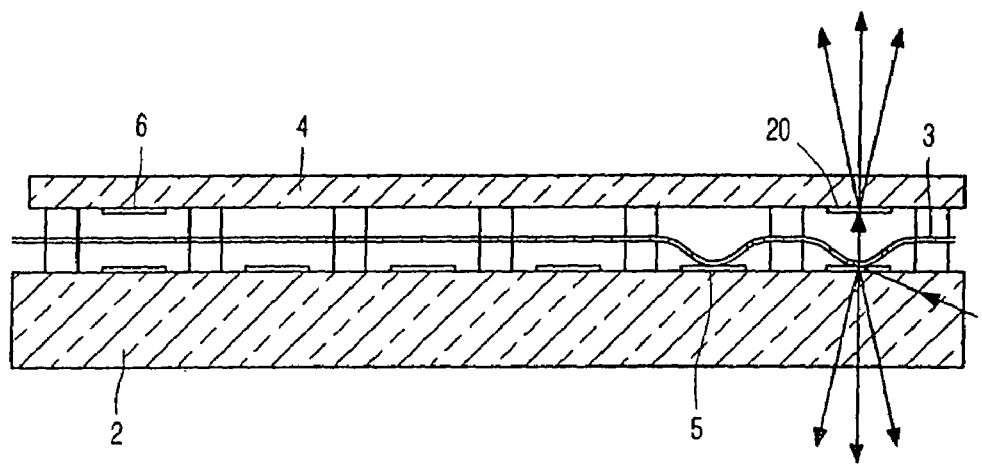
FIG. 2 shows a detail of the display device shown in FIG. 1.

FIG. 1 schematically shows a display device 1 in accordance with the invention. Said display device comprises a light guide 2, a movable element 3 and a second plate 4. Electrode systems 5 and 6 are arranged, respectively, on the sides of the light guide 2 and the second plate 4 facing the movable element 3. By locally generating a potential difference between the electrodes 5, 6 and the movable element 3, by applying electric voltages to the electrodes and the movable element, in operation, forces are locally exerted on the movable element, which press the movable element against the light guide or keep it at a distance from the light guide. The display device comprises a covering element 7, which forms an airtight connection with the light guide 2, thus forming an evacuated space 8. The display device further comprises a light source 9. FIG. 2 shows how the movable element 3 lies against the light guide 2. In this state, a portion of the light enters the movable element. This movable element spreads the light, so that it leaves the display device. The light can issue at both sides or at one side. Preferably, in order to cause the light to exit the movable element the movable element comprises a layer of a material (for instance a polymer), hereinbelow also called a "matrix layer", in which scattering centres are mixed. Such scattering centres may be formed by particles of a material other than the material of the matrix layer or may be formed by (air) bubbles in the matrix layer. Light entering the movable element is scattered by the scattering centres. In FIG. 2, this is indicated by means of arrows. The thickness of the matrix layer is preferably between 0.5 and 5 µm, with a most preferred range of 1-3 µm. The specific mass of the matrix material is preferably in the range from 1 to 5 gr/cc. The scattering particles could be made of for instance $TiO_2$, BN, $ZrO_2$, $SiO_2$, $Si_3N_4$, $Al^2O_3$, ITO (Indiumtinoxide) or diamond powder. The average size of the particles is preferably between 0.05 and 1 µm. Particles smaller than 0.05 µm and larger than 1 µm do not scatter the light very efficiently. The concentration of scattering particles is in the range from 1 to 50%. Preferably the difference in index of refraction between the matrix layer and the scattering particles is larger than 0.1. For smaller differences the scattering efficiency of the scattering particles is very low. Preferably the index of refraction is larger than 0.5. Preferred materials for the scattering particles are $TiO_2$, BN, and $AL_2O_3$, since these materials are practically colorless. $Ti_2O_3$ is particularly preferred because of its high index of refraction and hence larger difference in index of refraction between the matrix material and the scattering centres. The index of refraction of the matrix material is preferably close (differing less than approximately 0.2) to the index of refraction of the material of the light guide. The reflection on the contact surface between the light guide and the movable element is then small. Preferably the density of the scattering centres and the difference in refraction between the material of the scattering centres and the matrix material is such that the diffusion length of the light in the movable element is less than the distance between pixels. If the diffusion length of the light (=the average length light can travel in the movable element before being scattered) is less than the distance between pixels then light entering the movable element cannot exit at an adjacent pixel. Preferably the diffusion length is less than twice the thickness of the movable element. The diffusion length $d_0$ of light can be measured by measuring the amount of light $I_{unscattered}$ that leaves a movable element having a thickness d without being scattered. This amount equals $I_0 e^{-d/d_0}$, where $I_0$ is the intensity of the incoming light and d is the thickness of the movable element. The movable element itself should not guide the light, since this would spread light outside the visible areas thus giving a loss of intensity. By ensuring that the average diffusion length is less than the distance between pixels (i.e. between adjacent areas where the movable element can be brought into contact with the light guide) spreading of light from one pixel to another is prevented. By ensuring that the average diffusion length is less than twice the thickness of the movable element, formation of a "halo" around the pixel is prevented. The scattering length is roughly proportional to $((n_1-n_2)/(n_1+n_2))^2 \times$ the density of particles. In an embodiment using $TiO_2$ ($n_1$=2.8) particles of roughly 50-100 nm in a matrix material having $n_2$=1.5 and a volume concentration of particles of 10-40% a good scattering efficiency was achieved. The above given preferred aspects of the matrix material and the scattering centres alone or in combination are in themselves independent of whether or not measures for improving contact between the light guide and the movable element are present. In embodiments, the display device comprises color-determining elements 20. These elements may be, for example, color filter elements allowing light of a specific color (red, green, blue, etc.) to pass. In a preferred embodiment, UV light leaves the light guide and is incident on phosphor elements. The phosphor elements excited by the UV light emit colored light. The use of UV light and phosphor elements increases the efficiency of the display device. This advantage is in itself not dependent upon the above-described measures for improving the contact between the light guide and the movable element.

Figure 3A:
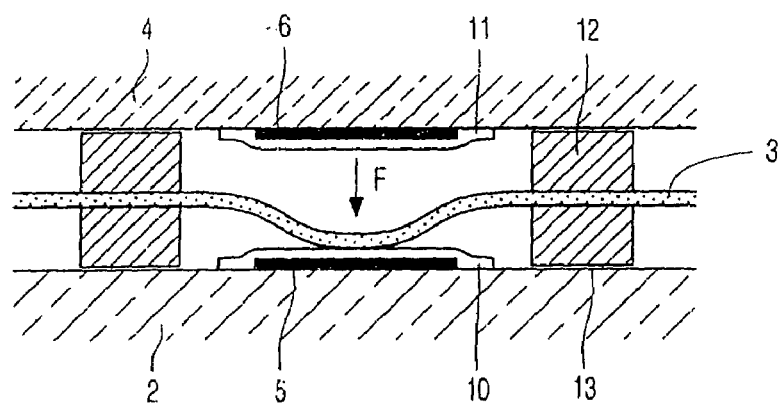
FIGS. 3A and 3B show further details of the embodiments of the display device shown in FIG. 1.
Figure 3B:
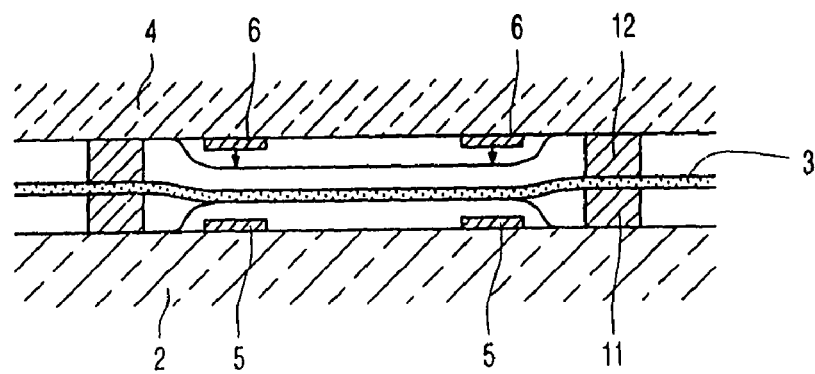

FIG. 3A shows a further detail of the display device shown in FIG. 1. The movable element 3 is positioned between the light guide 2 and the second plate 4 by means of spacers 12 and 13. Electrodes 5 and 6 are covered by insulating layers 10 and 11 in order to preclude direct electric contact between the movable element 3 and the electrodes. By applying voltages to the electrodes and the movable element, an electric force F is generated which presses the movable element against the electrode 5 on the light guide 2. The electrode 5 is transparent. The contact between the movable element and the light guide causes light to leave the light guide and enter the movable element at the location of the contact. In the movable element, the light is spread and leaves the display device via the transparent electrode 5 and the light guide 2. The force F is exerted at the location where the contact is made. If non-transparent electrodes are used, as shown in FIG. 3B, these electrodes should be provided next to the location where the optical contact between the light guide 2 and the movable element 3 is brought about. In FIG. 3B, an embodiment comprising two electrodes is shown. This has the drawback that more electrodes must be manufactured, thus causing an increase in costs and a greater risk of picture errors. The use of only one of the electrodes shown has the disadvantage that each of these electrodes must generate a larger force, requiring higher voltages, and the force is exerted asymmetrically. The movable element comprises means for removing electric charge. This can be achieved, for example, by making the movable element from a conductive polymer or adding a conductive polymer to the movable element, or by providing the movable element with a conductive layer, for example an indium-tin oxide layer which is provided on the side facing the light guide, or a conductive non-transparent electroconductive layer which is provided on the side facing the second plate 4.

Figure 4:
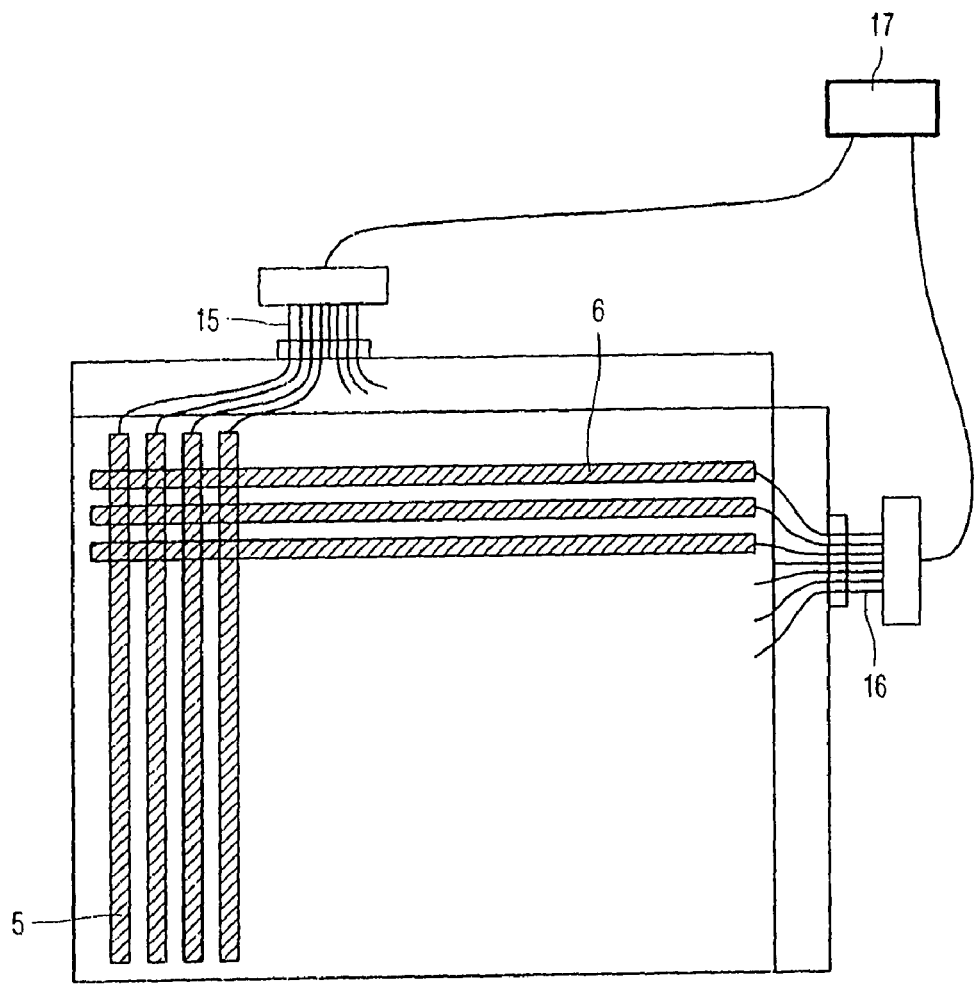
FIG. 4 is a plan view of the display device shown in FIG. 1.

FIG. 4 is a plan view of an embodiment of the display device shown in FIG. 1.

The electrodes 5 and 6 form a matrix. From a control unit 17, signals (electric voltages) are supplied to the electrodes 5 and 6 via the connections 15 and 16. By applying suitable potential differences to the electrodes 5 and 6, the movable element is moved, in operation, from and to the electrodes 5 and 6 at the location of the crossings of the electrodes 5 and 6.

The force which is locally exerted on the movable element by a potential difference between the electrodes and the movable element is governed by the potential differences, the distances between the electrodes and the movable element and the size of the surface area of the electrodes. By means of these forces the movable element is reciprocated. The force F which occurs between two electrodes (or between an electrode and the movable element) is approximately:

$$F = 1/2 \epsilon_0 (V/d)^2 . S$$

where F is the force, V is the potential difference, d is the distance between the electrodes and S is the surface area of the electrodes. In the absence of other forces, switching voltages of the order of magnitude of 10 to 100 V can be used to switch the movable element, i.e. cause it to locally make contact with the light guide or interrupt the contact with the light guide.

The smaller the-necessary force, the lower the necessary potential differences and the energy consumption and the higher the switching speed of the display device is. In FIGS. 2, 3A and 3B, a number of measures are shown to reduce the necessary forces or the necessary voltages. By arranging the movable element in an evacuated space, a difference in pressure between two sides of the movable element, i.e. the side lying against the light guide and the opposite side, is precluded.

Such a difference in pressure may result in a substantial adhesive force which has to be overcome before the movable element can be moved. The maximally possible under-pressure is equal to the pressure in the space around the movable element and the light guide. At an under-pressure of 1 atmosphere, the adhesive force is so large that potential differences of the order of 500 V must be applied to detach the movable element. Preferably, the pressure in the evacuated space is below 10 mbar. In the case of an under-pressure of 10 mbar, the necessary potential difference is reduced to 50 V. In yet another preferred embodiment, the pressure is below 0.1 mbar.

By removing electrostatic charge from the movable element, forces caused by electrostatic charging are precluded. Electrostatic charges can be removed by providing the movable element at one or both sides of the movable element with a conducting layer. Such a conducting layer can be a semi-transparent metal layer, such a semi-transparent aluminium layer, or a layer of a transparent conducting coating such as an ITO (Indium-tinoxide) coating. If a conducting layer is used on only one side, the material of the movable element preferably has some bulk conductance ($\rho \leq 10^6$-$10^7$ $\Omega$/cm). Alternatively the movable element itself has a relatively high bulk conductance ($\rho \leq 10$ $\Omega$/cm.

Figure 5:
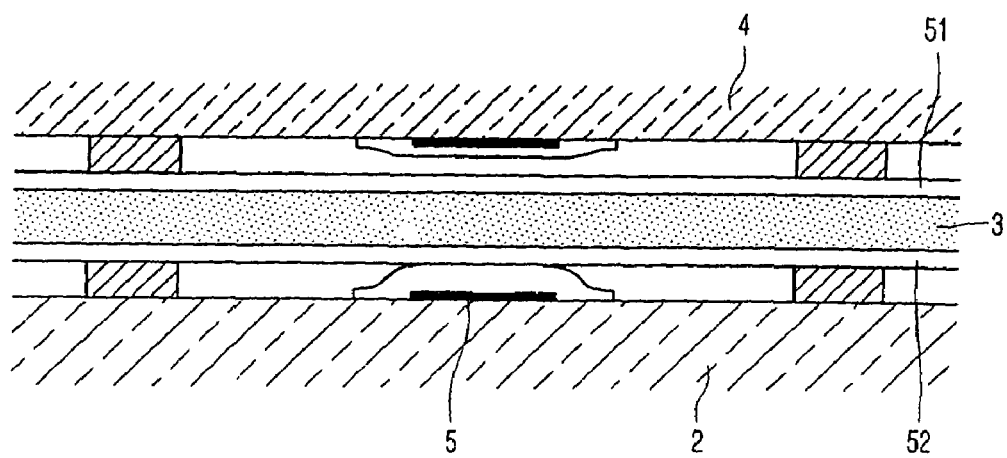
FIG. 5 shows an embodiment of the display device in accordance with the invention, in which an anti-adhesion layer is employed.

By using a transparent electrode at the location of the contact, the surface area of the electrodes which can be used to generate forces is enlarged, so that smaller potential differences are sufficient. The use of an anti-adhesion layer on the movable element and/or the light guide and/or the second plate precludes the occurrence of chemical forces. FIG. 5 shows a movable element provided with anti-adhesion layers 51 and 52.

Van der Waals' forces between mutually engaging surfaces of the movable element and the light guide may also bring about large forces. To preclude or reduce these forces, preferably, the side of the movable element facing the light guide or the side of the light guide facing the movable element has a roughness of more than 5 nm. Customarily, plasma etching of one or both of the above surfaces is employed to obtain the desired roughness.

Figure 6A:
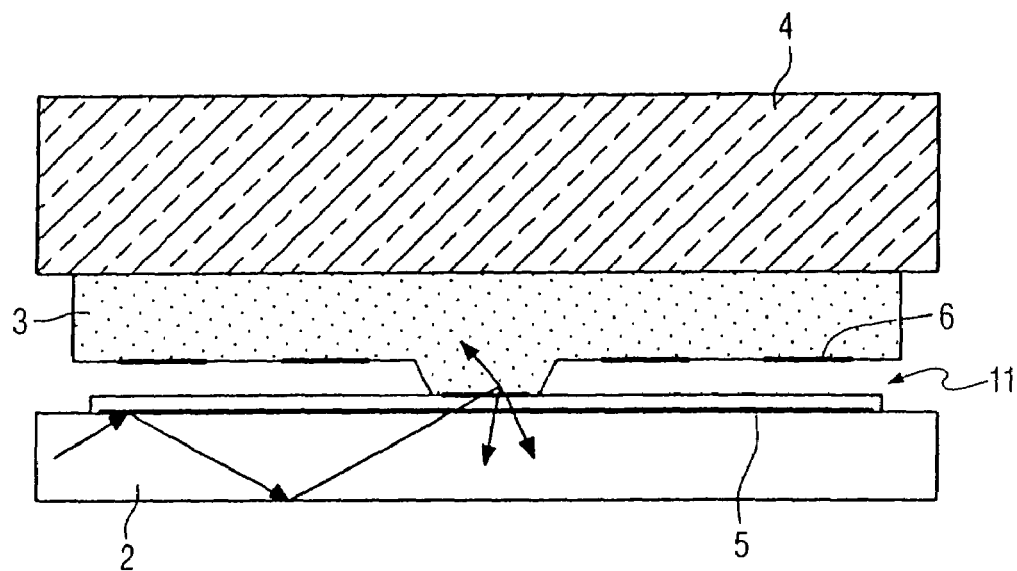
FIGS. 6A and 6B show an embodiment of the display device in accordance with the invention.
Figure 6B:
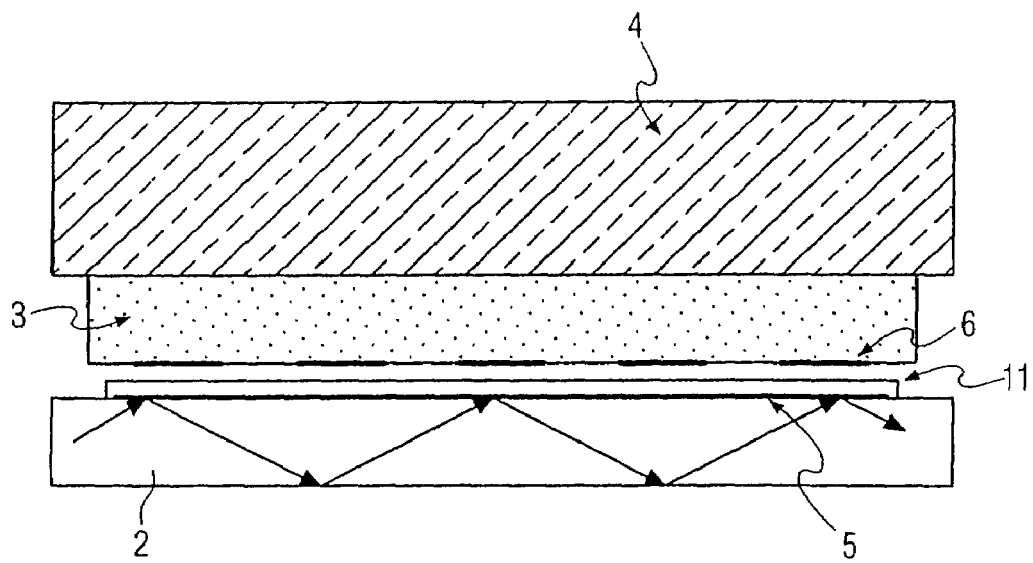

FIGS. 6A and 6B show an embodiment of the invention in which the movable element 3 is relatively thick, elastic and secured to a plate 4. By applying potentials between electrodes 5 and 6, the movable element is locally stretched, causing it to make contact with the light guide 2 (see FIG. 6A), so that light is emitted. In this example, the movement made by the movable element is an elongation. The advantage of this embodiment is that fewer spacers are required and the distance between the electrodes (hence the force exerted on the movable element) can be accurately adjusted. The movable element may be (largely) made of silicone rubber or flexible polyurethane (PUR) foam, in which scattering centres are present.

Other measures to reduce forces between the movable element and the light guide are:

Using for the movable element a material (the matrix material) with a small surface tension, i.e. smaller than 30 dyne/cm.

Ensuring that the touching surfaces of the movable element and the light guide are made of one and the same material. This can for instance be accomplished by coating the electrodes 5 and the movable element 3 with a same material, or, if the movable element is not coated, coating the electrodes with a layer of the material of the movable element.

In summary, the invention can be described as follows:

A display device comprises a light guide and a movable element. By locally exerting a force on the movable element by means of selection means, optical contact between the movable element and the light guide can be brought about. Measures are taken to employ the force exerted by the selection means as efficiently as possible. This can be achieved by making the force act at the location where the optical contact takes place and/or by reducing or eliminating adhesive forces caused, inter alia, by differences in pressure, static charging, surface stresses, van der Waals' forces and/or chemical forces. This results in an improved reliability of the display device, and if electrodes are used to generate the selective forces, the necessary potential differences are reduced.

It will be obvious that within the scope of the invention many variations are possible.

The invention claimed is:

1. A display device comprising:
    a light guide;
    a movable element; and
    selection means to locally bring the movable element into contact with the light guide,
    wherein the selection means comprise transparent electrodes and, in operation, the movable element, provided that it is in contact with the light guide, contacts the light guide at the location of an electrode, thus causing light to be emitted through the transparent electrode.

2. The display device of claim 1, wherein the movable element is electrically conducting and at a fixed potential.

3. The display device of claim 1, wherein there is no liquid between the movable element and the light guide.

4. The display device of claim 1, wherein the movable element is situated in an evacuated space below 0.1 atmosphere.

5. The display device of claim 4, wherein the evacuated space is below 10 Torr.

6. The display device of claim 1, wherein the movable element is arranged between the light guide and a further element, and the selection means comprise means for locally generating a force causing the movable element to move towards the light guide as well as a force causing the movable element to move towards the further element.

7. The display device of claim 1, wherein a surface of the movable element facing the light guide is a same material as a surface of the light guide facing the movable element.

8. A display device comprising:
    a light guide;
    a movable element; and
    selection means to locally bring the movable element into contact with the light guide;
    wherein the movable element is situated in an evacuated space below 0.1 atmosphere, and
    wherein the selection means includes transparent electrodes and, in operation, the movable element, provided that it is in contact with the light guide, contacts the light guide at the location of an electrode, thus causing light to be emitted through the transparent electrode.

9. A display device comprising:
    a light guide;
    a movable element; and
    selection means to locally bring the movable element into contact with the light guide,
    wherein at least one of the movable element and the light guide is provided with an anti-adhesion layer on the side at which the contact is made between the movable element and the light guide, and
    wherein the selection means comprises electrodes, and at least one of the first and second electrodes is substantially transparent.

10. The display device of claim 9, wherein the movable element is electrically conducting and at a fixed potential.

11. The display device of claim 10, wherein the movable element is situated in an evacuated space that is below 0.1 atmosphere.

* * * * *

UNITED STATES PATENT AND TRADEMARK OFFICE
CERTIFICATE OF CORRECTION

| | | |
|---|---|---|
| PATENT NO. | : 7,463,227 B2 | |
| APPLICATION NO. | : 10/628942 | |
| DATED | : December 9, 2008 | |
| INVENTOR(S) | : Gerardus G. P. Van Gorkom | |

It is certified that error appears in the above-identified patent and that said Letters Patent is hereby corrected as shown below:

On the Title page, after field (65), insert the following:
--(63) Related U.S. Application Data--
--Divisional of application No. 09/355,592, filed on November 15, 1999, now Pat. No. 6,628,246.--

On the Title page, after field (63), insert the following:
--(86) International Application Priority Data--
--PCT Filed: Nov. 24, 1998--
--PCT No.: PCT/IB98/01867--
--§371 (c)(1), (2), (4) Date: Nov. 15, 1999--

On the Title page, after field (86), insert the following:
--(87) International Application Publication Data--
--PCT Pub. No.: WO99/28890--
--PCT Pub. Date: Jun. 10, 1999--

On the Title page, after field (87), insert the following:
--(30) Foreign Application Priority Data--
--Nov. 29, 1997 (EP).................97203741--
--Jun. 22, 1998 (EP).................98202065--

UNITED STATES PATENT AND TRADEMARK OFFICE
CERTIFICATE OF CORRECTION

PATENT NO. : 7,463,227 B2
APPLICATION NO. : 10/628942
DATED : December 9, 2008
INVENTOR(S) : Gerardus G. P. Van Gorkom It is certified that error appears in the above-identified patent and that said Letters Patent is hereby corrected as shown below:

In column 1, line 4, after the Title, insert the following:
--This application is a divisional of U.S. Patent Application No. 09/355,592, filed on November 15, 1999, which issued as U.S. Patent No. 6,628,246, on September 30, 2003, which claims priority to PCT Patent Application No. PCT/IB98/01867, filed on November 24,1998, which claims priority to EP Patent Application No. 97203741, filed on November 29,1997, and EP Patent Application No. 98202065, filed on June 22, 1998, each of which is hereby incorporated by reference in its entirety.--

Signed and Sealed this

Nineteenth Day of May, 2009

JOHN DOLL
*Acting Director of the United States Patent and Trademark Office*